United States Patent
McCutchen

(10) Patent No.: US 8,025,801 B2
(45) Date of Patent: Sep. 27, 2011

(54) RADIAL COUNTERFLOW INDUCTIVE DESALINATION

(75) Inventor: Wilmot H. McCutchen, Orinda, CA (US)

(73) Assignee: McCutchen Co., Portland, OR (US)

( * ) Notice: Subject to any disclaimer, the term of this patent is extended or adjusted under 35 U.S.C. 154(b) by 1042 days.

(21) Appl. No.: 11/893,454

(22) Filed: Aug. 16, 2007

(65) Prior Publication Data
US 2009/0045150 A1    Feb. 19, 2009

(51) Int. Cl.
*B01D 35/06* (2006.01)

(52) U.S. Cl. ..... 210/223; 204/554; 204/660; 210/360.1; 210/380.1; 210/175; 210/365; 210/787; 210/781; 210/748.01; 494/14; 494/22; 494/27; 494/36; 494/42

(58) Field of Classification Search .......... 210/222, 210/223, 695, 512.3, 748.03, 748.11, 167.13, 210/365, 781, 787, 360.1, 380.1, 175, 748.01; 417/50; 266/234; 204/554, 660; 494/14, 494/22, 27, 36, 42
See application file for complete search history.

(56) References Cited

U.S. PATENT DOCUMENTS

| | | | |
|---|---|---|---|
| 512,340 A | 1/1894 | Tesla | |
| 2,685,335 A | 8/1954 | McCutchen | |
| 2,764,095 A * | 9/1956 | Baker | 417/50 |
| 3,187,898 A * | 6/1965 | Baker | 210/331 |
| 3,411,447 A * | 11/1968 | Fox et al. | 417/50 |
| 3,520,649 A | 7/1970 | Tomany et al. | |
| 3,717,554 A * | 2/1973 | Ruthrof | 202/238 |
| 3,731,800 A | 5/1973 | Timson | |
| 3,755,644 A | 8/1973 | Lewis | |
| 3,769,781 A | 11/1973 | Klein et al. | |
| 3,990,968 A | 11/1976 | Oesterle | |
| 4,272,011 A | 6/1981 | Nagatomo et al. | |
| 4,273,562 A | 6/1981 | Niskanen | |
| 4,292,051 A | 9/1981 | Kime | |
| 4,326,666 A | 4/1982 | Fujiwara et al. | |
| 4,357,152 A | 11/1982 | Duske et al. | |
| 4,362,540 A | 12/1982 | Strahsner | |
| 4,371,382 A | 2/1983 | Ross | |
| 4,490,252 A | 12/1984 | Brigante | |
| 4,668,383 A * | 5/1987 | Watson | 209/216 |
| 4,995,425 A * | 2/1991 | Weisenbarger et al. | 137/827 |

(Continued)

OTHER PUBLICATIONS

A. De La Torre et al., Slow Dynamics in a Turbulent von Karman Swirling Flow, arXiv:physics/0702151v1, Feb. 19, 2007. 4 pgs.

(Continued)

*Primary Examiner* — Tony G Soohoo
*Assistant Examiner* — David C Mellon
(74) *Attorney, Agent, or Firm* — Marger Johnson & McCollom PC

(57) ABSTRACT

Simultaneous source-sink flow, or radial counterflow, is driven by a centrifugal pump disposed within a casing. Radially outward source flow of brine goes into a shrouding tank and concentrates while a radially inward sink flow of fresh water flows back over the pump to axial extraction. An axial pump drives sink flow and axial extraction. Convergent sink flow passes under an inductor to an axial exhaust port. Induced viscosity and inductive repulsion hinder the passage of brine in sink flow, so only fresh water can reach the axial exhaust port. Crystallization of scale-forming salts is aided by Joule heating from the inductor. Solvent and gases are continuously axially extracted in sink flow, favoring crystallization. Sodium chloride is cooled and crystallized in the shrouding tank. Brine comprising other salts flows out of the tank to treatment by suitable means. Thus brine is separated into fresh water, crystallized salt, and concentrated brine.

15 Claims, 6 Drawing Sheets

U.S. PATENT DOCUMENTS

| | | | |
|---|---|---|---|
| 4,999,597 | A | 3/1991 | Gaynor |
| 5,133,190 | A | 7/1992 | Abdelmalek |
| 5,393,421 | A | 2/1995 | Ohe et al. |
| 5,449,249 | A * | 9/1995 | Husten .................. 405/128.15 |
| 5,466,270 | A | 11/1995 | Abdelmalek |
| 5,534,118 | A | 7/1996 | McCutchen |
| 5,554,343 | A | 9/1996 | Wade |
| 5,622,621 | A * | 4/1997 | Kramer ...................... 210/188 |
| 5,688,377 | A | 11/1997 | McCutchen |
| 5,728,186 | A | 3/1998 | Jonsson |
| 5,824,136 | A | 10/1998 | Meline |
| 5,902,224 | A | 5/1999 | Bloom |
| 6,116,027 | A | 9/2000 | Smith et al. |
| 6,292,085 | B1 * | 9/2001 | Cho ............................ 336/200 |
| 6,294,139 | B1 | 9/2001 | Vicard et al. |
| 6,716,269 | B1 | 4/2004 | Graff et al. |
| 7,033,481 | B1 | 4/2006 | Schlager et al. |
| 7,150,836 | B2 | 12/2006 | Meikrantz |
| 7,217,368 | B2 | 5/2007 | Lane |
| 7,238,289 | B2 | 7/2007 | Suddath |
| 7,244,360 | B2 | 7/2007 | Cho |

OTHER PUBLICATIONS

Kevin T. Raterman et al., A Vortex Contactor for Carbon Dioxide Separations, www.net1.doe.gov/publications/proceedings/01/carbon_seq/7b3.pdf (date unknown), 11 pgs.

Andrew M. Crocker et al., Experimental Results of a Vortex Tube Air Separator for Advanced Space Transportation, AIAA 2003-4451, 39th Joint Propulsion Conference & Exhibit, Huntsville, Alabama, Jul. 20-23, 2003, pp. 1-12.

IPCC Special Report on Carbon Dioxide Capture and Storage, Chapter 3, Capture of CO2 (2005), pp. 108-122, 168-171.

US EPA, External Combustion Sources, Bituminous and Sub-bituminous Coal Combustion, Sep. 1998, 15 pgs.

P.J. Zandbergen et al., Von Karman Swirling Flows, Annu. Rev. Fluid Mech. 1987, 19: pp. 465-491.

Ivan Delbende et al., Various Aspects of Fluid Vortices, C.R. Mechanique 332 (2004) pp. 767-781.

Daviaud et al., Turbulence in Rotating Flows, 2005, http://www-drecam.cea.fr/spec/Pres/Git/TRF/trf.htm, 2 pgs.

J.M. Lopez, Characteristics of Endwall and Sidewall Boundary Layers in a Rotating Cylinder With a Differentially Rotating Endwall, J. Fluid Mech. (1998), vol. 359, pp. 49-79.

J.M. Ottino, Mixing, Chaotic Advection, and Turbulence, Annu. Rev. Fluid Mech. 1990, 22: pp. 207-253.

Secondment to the International Test Centre for CO2 Capture (ITC), University of Regina, Canada; Jan.-Mar. 2005, Report No. Coal R303 DTI/Pub URN 06/798, May 2005, pp. 1-94.

Chen et al., Fractal-like Tree Networks Increasing the Permeability, Physical Review E 75, 056301, May 1, 2007, 8 pgs.

Klaus J. Kronenberg, "Experimental Evidence for Effects of Magnetic Fields on Moving Water," IEEE Transactions on Magnetics, vol. Mag-21, No. 5, Sep. 1985.

Sangho Lee, et al., "Control of Scale Formation in Reverse Osmosis by Membrane Rotation," Desalination 155 (2003) pp. 131-139, p. 137.

Mushtaque Ahmed, et al., "Feasibility of Salt Production from Inland RO Desalination Plant Reject Brine: A Case Study," Desalination 158 (2003) pp. 109-117.

Vladimir Shtern, et al., "Collapse, Symmetry Breaking, and Hysteresis in Swirling Flows," Ann. Rev. Fluid Mech. 1999, 31:537-66, pp. 540-542, 545-546, 551.

* cited by examiner

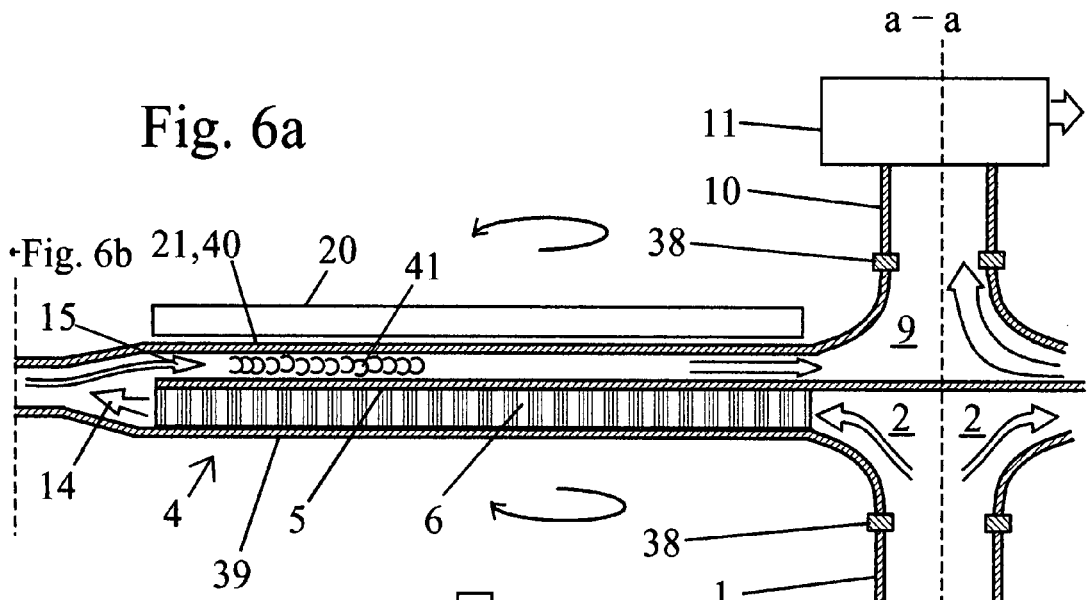
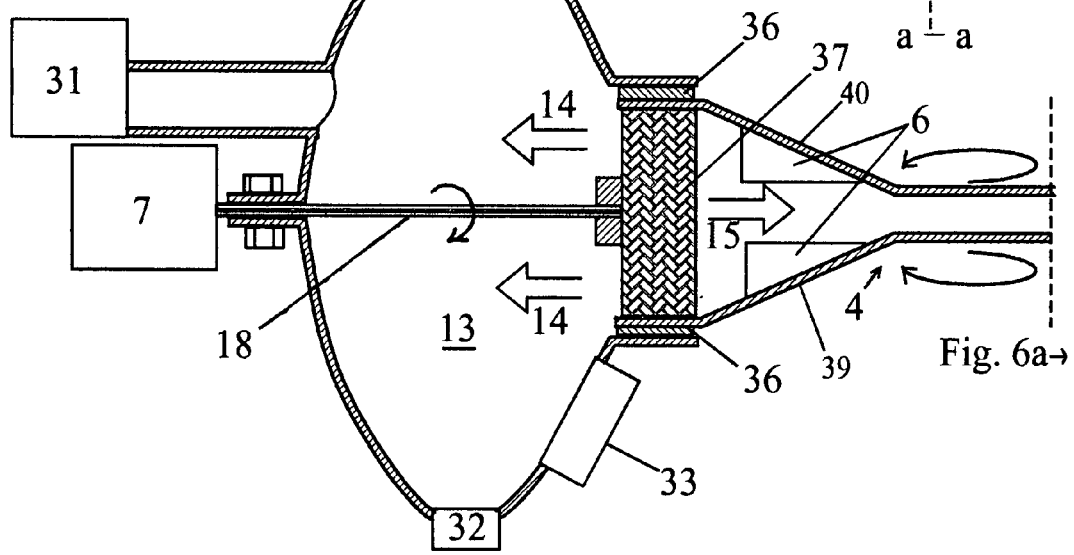

RADIAL COUNTERFLOW INDUCTIVE DESALINATION

BACKGROUND OF THE INVENTION

This invention relates to centrifugal pumps, fluid separation, and desalination without filter media, membranes, ion exchange, electrodialysis, or distillation. It applies to scale prevention by physical water treatment, and also to continuous crystallization and oil-water-brine separation assisted by electromagnetic force.

Approximately half of the world's installed desalination capacity is in reverse osmosis plants. Reverse osmosis (RO) desalination is done by means of a membrane separating brine from product water. High pressure on brine causes low salinity water to permeate through to the other side of the membrane. Chemical diffusion is the conventional explanation of how reverse osmosis works.

The applied pressure in reverse osmosis is sufficient to overcome the osmotic pressure at the given concentration of salts in the brine. Higher salinity requires higher pressure. Brackish water reverse osmosis pressure is between 17 and 27 bar (one bar is one times the atmospheric pressure, $10^5$ Pa or $10^5$ N/m$^2$, which in English units is 14.7 pounds per square inch). Seawater operating pressure is between 52 and 60 bar, typically about 1000 psi in English units. Desalting seawater is 3 to 5 times more expensive than desalting brackish water, which is twice as expensive as ordinary municipal drinking water treatment. For potable water, the target is total dissolved solids (TDS) of less than 500 parts per million (ppm).

The disadvantages of reverse osmosis are: (1) the energy required for operating pressure, (2) the necessity of extensive pretreatment upstream of the membrane, (3) costs and downtime due to membrane fouling, and (4) a voluminous stream of reject brine that pollutes the environment. RO reject brine is classified as industrial waste by the US Environmental Protection Agency. Dewatering the RO reject brine using reverse osmosis would require very high pressure because of the very high osmotic pressure that must be overcome, therefore this solution is prohibitively expensive. Dumping or hiding the reject brine is not a solution.

An example of the unsolved problem posed by the voluminous stream of RO reject brine is the largest reverse osmosis plant in the United States, the Yuma Desalting Plant. This expensive modern facility has been idle since a 6-month test period ending in 1993 because dumping of its voluminous 9,400 ppm RO reject brine stream proved environmentally unacceptable. If operated at full capacity, with feed of saline agricultural drainage water (TDS 2,900 ppm) from the Wellton Mohawk Valley of approximately 390 million liters (102.7 million gallons) per day, the Yuma Desalting Plant could produce about 275 million liters (72.4 million gallons) of desalted water per day.

The Yuma reject brine stream (TDS 9,400 ppm) is a daunting 117 million liters, or 117,000 m$^3$ per day. Although the waste brine is relatively low in salinity, over time the salts accumulate where it is dumped, poisoning local fauna and creating a putrid trap for migrating waterfowl. From this example it should be clear that concentration of RO reject brine is an important unsolved problem in the art of desalination and a critical need for environmental protection as humanity struggles to increase water supply.

Seawater salinity is approximately 35,000 ppm. Most of the salt is sodium chloride, but calcium carbonate and sulfate salts are also present in high concentrations, and these other salts are what cause scale, an insulating crust on heat exchange surfaces, making distillation difficult. These scale-producing salts also block reverse osmosis membranes, so a necessary step is pretreating the brine upstream of the membrane.

Various physical water treatment devices and processes use electromagnetic force in combination with flow velocity to cause Lorentz force on ions in the feedwater. Laminar flow is considered to be good, because turbulent flow would remix the ions. However, because Lorentz force is proportional to flow velocity, and laminar flow must be slow, prior art in this area has significant limitations.

Getting potable water from seawater is much more challenging for reverse osmosis than the Yuma reject brine (TDS 9,700). The energy requirement is very large, due to the high pressure required. RO desalination of seawater has a typical recovery rate of only 50%, so the reject brine would have a salinity of approximately 70,000 ppm, or 7%, and it would be as voluminous a stream as the stream of potable water produced. Dumping such a voluminous stream of highly concentrated industrial waste is not a long-term option in a world with rapidly increasing water needs. A high salinity plume dumped into the ocean is not a sustainable solution because no one wants a local Dead Sea. Various proposals for hiding the waste stream underground or in the ocean have transportation problems and are not really solutions at all.

The only known dewatering method to reduce the volume of reject brine is evaporation ponds, which require valuable space and blight the environment near production facilities. Evaporation ponds are a toxic trap for migrating waterfowl. Industrial waste dumpsites, even temporary ones, are not satisfactory solutions to the unsolved problem of reject brine from reverse osmosis.

Another major cause of environmental blight is oil and natural gas wells, which produce 20 to 30 billion barrels of brine each year. This water ranges in salinity from a few thousand to 463,000 ppm. The volume is 70 times the total of all liquid hazardous wastes generated in the U.S. Approximately 95% of this brine is reinjected, at least by responsible operators, but that still leaves a huge stream being dumped into evaporation ponds. A need exists for a better way than evaporation ponds to concentrate produced brine from oil and gas wells. A need also exists for electromagnetic oil-brine separation means.

SUMMARY OF THE INVENTION

Radial counterflow within a casing is caused by a centrifugal pump and an axial pump. The centrifugal pump advects brine radially outward, and back pressure in combination with the suction of an axial pump advects fresh water radially inward to axial extraction. A baffle separates the radially outward source flow from the radially inward sink flow. Source flow is divergent, and sink flow is convergent. Sink flow is between the casing and the rotating, shearing baffle.

An inductor causes wall-normal force advecting brine away from the casing and into a boundary layer against the baffle. Induced viscosity in brine impedes its sink flow, but fresh water slips through. Runners on the baffle advect brine away from axial extraction. What flows through an axial exhaust port is water of reduced salinity. What concentrates in a shrouding tank about the centrifugal pump is concentrated brine. Agitation and continuous axial extraction of gases and solvent accelerates crystallization.

High shear creates turbulent vortices in the brine, each of which, large or small, perform centrifugal separation. Fresh water concentrates at the vortex axes; concentrated solids grind together in shells at vortex peripheries. Back pressure and the suction of the axial pump advect fresh water along the vortex axes in sink flow through the bulk. The inductor ejects the conductive shells of the vortices from the converging sink flow. Microscopic separation effects of the turbulent vortices are collected by the forcing regime of centrifugal pump, axial pump, and inductor.

Osmotic pressure is overcome by focused advection along the axes of turbulent vortices, driven by back pressure and by axial suction. Turbulence, together with said driving forces which organize it, give the bulk an effective porosity allowing for fresh water to converge to axial extraction while brine is excluded by its conductivity and by its density.

Axial extraction of solvent (fresh water) supersaturates the brine, which collects in the shrouding tank. Concentration, agitation, Joule heating from the inductor, and continuous axial extraction of solvent and gas during crystallization provide favorable conditions for nucleation and secondary crystallization of calcium carbonate and sulfate scale. Cooling means at the tank wall assist crystallization of sodium chloride. A concentrated brine stream of other salts flows from the tank.

Metal recovery from pit water, slurry, or industrial wastewater is practiced in the same device. Grooved runners in the centrifugal pump trap metal particles, and the repulsive force of the inductor flushes the particles out of the grooves into a sink flow within the casing. Lighter solids and oils proceed radially out, and metal is axially extracted below the baffle.

Feedwater can be reverse osmosis reject brine, seawater, boiler water, industrial wastewater, pit water, slurry, or produced brine from oil and gas wells. No pretreatment of the feedwater is necessary, and high salinity is no problem. Separation and crystallization is continuous, in a low tech device having high power efficiency.

SUMMARY OF THE DRAWING FIGURES

FIG. 1 shows a schematic elevational view of a portion of the preferred embodiment. The device is symmetrical about the axis a-a. The centrifugal pump comprises a single impeller.

FIG. 6a shows an alternative embodiment of the present invention wherein the centrifugal pump comprises two opposed counter-rotating centrifugal impellers.

FIG. 6b shows the tank and the preferred drive means for the alternative embodiment.

DRAWING REFERENCE NUMERALS

1—axial feed conduit
2—axial feed port
3—feed source
4—centrifugal pump
5—baffle
6—runners
7—drive means
8—solids collection tank
9—axial exhaust port
10—axial exhaust conduit
11—axial pump
13—tank
14—source flow
15—sink flow
16—electrical current source
17—current varying means
18—drive spindle for centrifugal pump
19—passage for sink flow between baffle and casing
20—inductor
21—casing
22—sink flow of solids
23—repulsive force on metals captured in grooves in the runners
24—vortex axis
25—source flow above baffle
26—sink flow of fresh water above baffle
27—wall-normal force from the inductor on conductive constituents in the passage for sink flow
28—boundary layer where solids flow radially inward
29—grooves on runner for capturing metal particles in source flow of centrifugal pump
30—key for drive spindle
31—concentrated brine port for extracting uncrystallized brine from the tank
32—crystallized solids port for extracting crystallized sodium chloride and solids from the tank
33—chilling jacket for cooling the brine in the tank
34—gas port
35—regulation means for gas port
36—rotatable bearing seal slidably engaging the impellers and the tank wall
37—drive wheel
38—rotatable bearing seal slidably engaging the impellers and the axial feed conduit and axial exhaust conduit
39—bottom impeller, which is also part of the casing
40—top impeller, which is also part of the casing
41—radial vortex in the passage for sink flow

DETAILED DESCRIPTION OF THE PREFERRED EMBODIMENT

Figure 1:
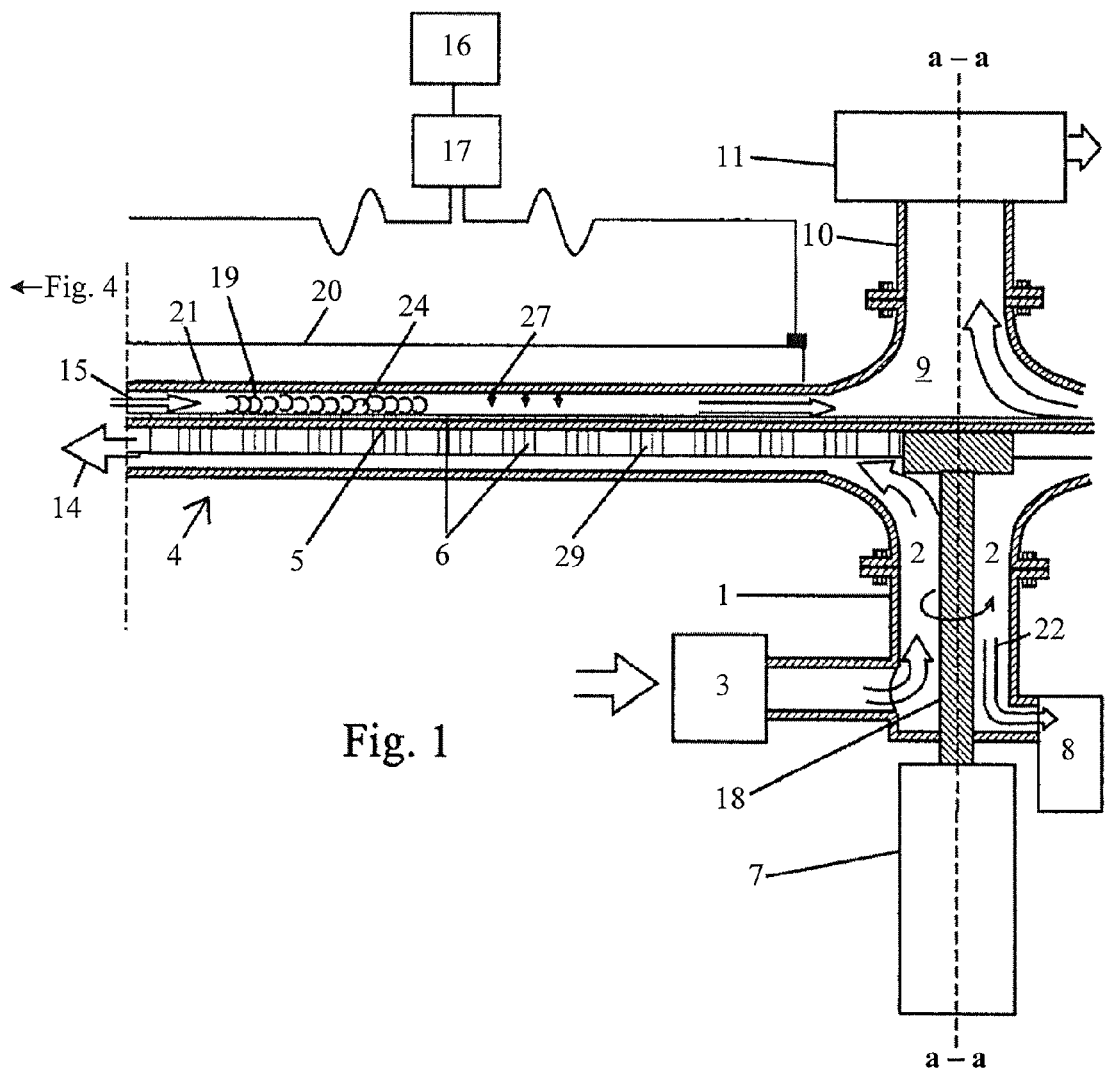
Figure 4:
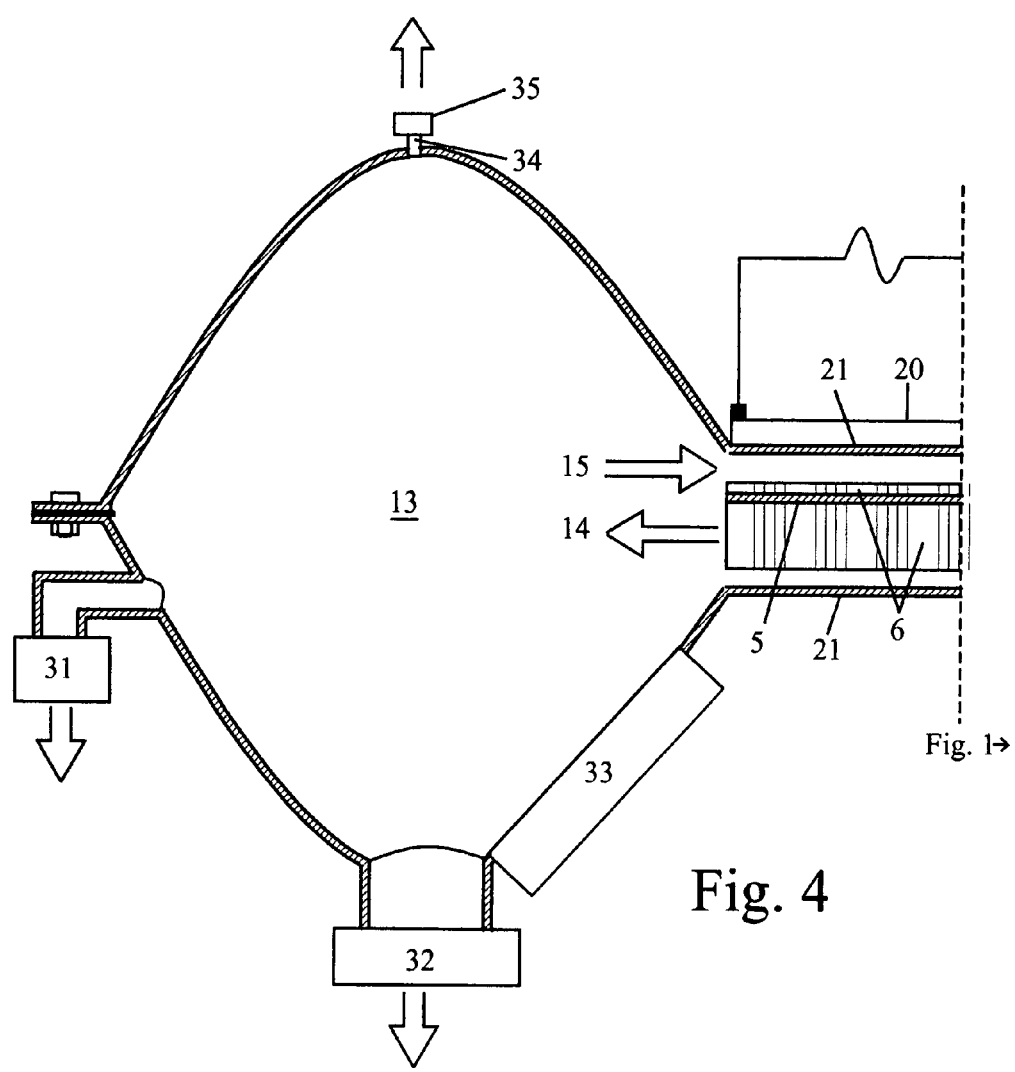
FIG. 4 shows the tank of the preferred embodiment shown in FIG. 1.

FIG. 1 shows a schematic cross-sectional elevational view of a portion of the preferred embodiment for desalination and for concentrating and crystallizing brine. This device is also suitable for metal recovery from brine. FIG. 4 connects at the dashed line as indicated. Symmetry is about the axis a-a, so there is a missing portion toward the right which is the same as what is shown in FIG. 1 and FIG. 4.

This embodiment is preferred over the alternative embodiment shown in FIG. 6, which comprises counter-rotating centrifugal impellers, because it is simpler, and does not require large seals. Which embodiment is the best mode of practicing the present invention will depend on the expense and capacity required in particular applications. Simplicity is preferable, and the preferred embodiment shown in FIG. 1 most clearly illustrates the present invention.

By the term brine is meant a mixture of liquids and conductive solids which may also comprise gases. Brine includes seawater, the reject stream from reverse osmosis operations, produced water from oil and gas wells, metallic pit water, slurry, industrial wastewater, and solvent from metal finishing operations. It also includes slurry containing gold or other metals. The term brine is meant to be general and inclusive, and not restricted to solutions of sodium chloride. Supersaturated solutions are also included in the term brine.

Brine flows from a feed source 3 through an axial feed conduit 1 through an axial feed port 2 into the interior of a casing 21 and then radially outward from the axis a-a into a shrouding tank 13 due to the action of a rotatable centrifugal pump 4 advecting fluid radially outward from the axis a-a. Source flow 14 is shown by an arrow pointing into the tank. Simultaneously, there is a sink flow 15 from the tank 13 radially inward and converging within the casing 21 toward the axis a-a. Sink flow is caused by back pressure from the flow into the tank and by suction of an axial pump 11. Said simultaneous source-sink flow will be referred to as radial counterflow.

The casing is preferably of non-conductive, corrosion-resistant, and durable material such as various plastics used in seawater applications. The casing provides a dielectric between the inductor 20 and the brine in the interior of the casing.

Radial counterflow occurs both below and above a baffle 5 which is part of the centrifugal pump 4 and is disposed within the casing 21 between the axial feed port 2 and the axial exhaust port 9. The baffle comprises runners 6 on both sides, the runners configured such that they advect fluid radially outward from the axis a-a as the centrifugal pump 4 rotates. The baffle 5 is approximately perpendicular to flow coming through the axial feed port 2. Between the baffle 5 and the portion of the casing 21 wherein is the axial exhaust port 9 is a passage for sink flow 19. Shear between the rotating baffle 5 and the static casing 21 causes turbulence 24 in the passage for sink flow 19. Above the baffle 5, in the passage for sink flow 19, radial counterflow consists of a sink flow of fresh water and gases 26 and a source flow of brine 25. Below the baffle, radial counterflow consists of the source flow of feed brine 14 and the sink flow of solids 22 including metals. See FIG. 3 for a more detailed explanation of flows.

Sink flow 15 is of fresh water above the baffle 5 and of solids 22 below the baffle. Solids, including metals, pass down through the axial feed conduit 1 and into a solids collection tank 8. Solids also collect in the tank 13. See FIG. 4. The sink flow of solids 22 occurs in a boundary layer against the casing and under the centrifugal pump 4 and is caused by recirculating flow from the tank 13 and the teacup effect. See FIG. 3.

Sink flow converging to the axial exhaust port 9 in the passage 19 must be through high turbulence 24 and through the electromagnetic fields from an inductor 20 which cause a wall-normal force 27 on conductive constituents, such as entrained brine. Liquid which can run this gauntlet will be water having low conductivity, i.e. fresh water having low salinity.

A drive spindle 18 connects the centrifugal pump to drive means 7. Drive means could be an electric motor, an engine, a windmill, or a variety of other means for causing rotation of the drive spindle. Preferably, the runners 6 are curved and suitable for advecting liquid against high pressure. Preferably, the centrifugal pump is constructed of durable, corrosion resistant, and non-conductive material. Such material is well known in the art of pumps.

An inductor 20 is disposed above the passage for sink flow 19 and about the axial exhaust port 9. The inductor is connected to a current source 16 through current varying means 17. Preferably the inductor driving frequency is in the radio frequency range. The conductive elements of the inductor are electrically insulated from the liquid within the casing and from each other. A wall-normal force 27 on conductive constituents in turbulence within the passage for sink flow 19 is caused by the oscillating electromagnetic fields of the inductor 20. By the term inductor is meant any device which induces electromagnetic force in a conductor. The term inductor is intended to be general and includes permanent magnets and coils with either alternating or direct current. See FIG. 5 for a detail of the inductor. The preferred embodiment of the inductor is a radio frequency bifilar pancake coil invented by Nikola Tesla. See U.S. Pat. No. 512,340 to Tesla (1894). Although the coil is known, its application to desalination is new.

Turbulent vortices form shells of concentrated brine at their peripheries because solids are denser than water and are therefore centrifugally separated from water in the turbulent vortices. Turbulent eddy vortex radii (r) are very small, therefore radial acceleration (a) is high on constituents within the vortex, and separation by density occurs, because $a=v^2/r$. The present invention provides means for exploiting the tiny centrifugal separation effects of innumerable turbulent vortices before they are remixed in the turbulence. The forcing regime of radial counterflow connects the turbulent eddy vortices, as capillaries, into a coherent sink flow of fresh water through the vortex cores. The coherence creates bulk porosity for fresh water, while rejecting brine. Adding to the effectiveness of said radial counterflow centrifugal separation of fresh water from brine is the separation effect of the inductor.

Said centrifugally separated brine shells of the vortices 24 in the passage 19 for sink flow are highly saline and therefore very conductive, but their fresh water core is not as conductive as the shell. Induced emf caused by the inductor ejects the brine shells radially outward from the passage 19 by Lenz's law as sink flow is sucked through the axial exhaust port 9, so the brine shells are stripped from their cores of fresh water as sink flow proceeds. Entrained brine remaining in sink flow through the passage 19 is affected by wall-normal force 27 due to the inductor and is pushed against the baffle 5, where it becomes part of the boundary layer against the baffle which is advected radially outward out of the passage 19 as the baffle rotates.

Cascading devices according to the present invention, without inductors, could increase separation to the purity desired. However, the addition of an inductor is preferred for producing water having minimal salinity in a single device. The inductor 20 also aids in nucleation of calcium carbonate and sulfate crystallization by providing activation energy through Joule heating of the bulk.

A tank 13 receives brine advected radially outward by the centrifugal pump. The back pressure is focused onto the sink flow conduits provided by turbulent vortices. These are the low pressure weak points, giving an effective porosity to the bulk such that fresh water, which is in high concentration at the axes of the turbulent vortices due to its lower density, slips through source flow in sink flow. Osmotic pressure is overcome by organized turbulence, focused back pressure, and the suction of an axial pump 11 in radial counterflow. This is a different approach than the brute force, unfocused bulk pressurization of reverse osmosis.

An axial exhaust port 9 at the center of the casing communicates with an axial exhaust conduit 10. Although sufficient feed pressure or centrifugal pump back pressure could drive fresh water through the axial exhaust port to collection, the addition of an axial pump 11 is preferable because it stretches the vortex axes in the passage 19 and thereby increases vorticity to improve coherence of the vortices and the consequent bulk porosity which allows for sink flow without wasted energy. The axial pump 11 also gives the extracted fresh water sufficient head to go through processing pipes to collection in a tank. The net positive suction head (NPSH) for the axial pump is provided by the back pressure. Many different pumps could be used for the axial pump, including a centrifugal pump within a casing according to the present invention, making a cascade. Water having low salinity, light oils, low specific gravity hydrocarbons such as gasoline, and evolved gases go through the axial pump to processing by suitable means.

Brine, supersaturated by extraction of water through the axial exhaust port 9 collects in the shrouding tank 13 disposed about the centrifugal pump. The tank communicates with the interior of the casing and receives fluid advected radially outward in source flow by the centrifugal pump. Reaction products from precipitation or crystallization, including gases and water, are continuously extracted from the tank in the sink flow, thus favoring nucleation and secondary crystallization in the tank. Flowing from the tank are gases, crystallized salts, solids, and concentrated brine. These are in separate streams and may easily go to subsequent treatment by suitable means. Suitable means for said concentrated brine include another device according to the present invention, using the brine as feed through its axial feed port, in a cascade.

Operation of the Preferred Embodiment

Turbulence is conventionally regarded as a useless degradation of mechanical energy, a cause of unwelcome drag force and therefore unworthy of interest except as a nuisance. Whatever centrifugal separation effects may occur in turbulent vortices are quickly lost as the vortex remixes. The present invention organizes turbulent vortices into connected capillaries feeding an arterial sink flow, so the centrifugal separation effects within the eddies are collected as a sink flow of fresh water. The coherent branched network of vortices give the bulk an effective porosity by providing numerous low pressure weak spots against a back pressure, which drives the sink flow through the vortices.

Eddies in the high turbulence provide low pressure gradients where low density fractions, such as fresh water and gases, concentrate. Said low pressure gradients communicate circuitously with the low pressure in the axial exhaust conduit 10 caused by the suction of the axial pump 11. Turbulent eddies are sink flow capillaries. Sink flow 15 is forced by the suction of the axial pump 11 and by back pressure from the shrouding tank 13.

Brine is in high concentration away from the eddy vortex axes, therefore the peripheries of the vortices are very conductive but the cores are not. Centrifugal separation and repulsion by the inductor 20 drives dissolved solids away from the passage for sink flow 19 and into a boundary layer 28 against the rotating baffle 5. As sink flow converges to the axial exhaust port 9, it becomes progressively fresher by centrifugation, repulsion, and flushing of brine out of the space between the baffle 5 and the casing 21. See FIG. 3.

At each eddy periphery is a centrifugated concentrate, and adjacent eddies grind together creating high probability of ions overcoming electrostatic repulsion and the shielding effect of their envelope of water molecules to cohere in crystals. Concentration and eddy grinding provide favorable conditions for nucleation and secondary crystallization. Reaction products such as water and gases fall into the vortex axis because they are less dense than crystals and brine. Concentrated brine and nucleated crystals grind in high turbulence at the eddy peripheries as reaction products are continuously extracted. Supersaturation under high agitation occurs in the shrouding tank 13 disposed about the centrifugal pump and receiving continuous infusions of more brine as water is continuously extracted in the sink flow. The concentration of dissolved solids in the tank reaches a point where sodium chloride and other crystals drop out. A concentrated brine is extracted for processing by suitable means to recover other salts. Calcium carbonate and other scale-forming salts precipitate due to Joule heating by the inductor and supersaturation by continuous axial extraction of fresh water and gases.

The axial pump 11 draws fresh water radially inward through the sink flow passage 19 and through the axial exhaust port 9 thereby stretching the axes of turbulent vortices, Stretching the vortex axes increases vorticity and sustains coherence of the capillary network that sustains bulk porosity.

Figure 5:
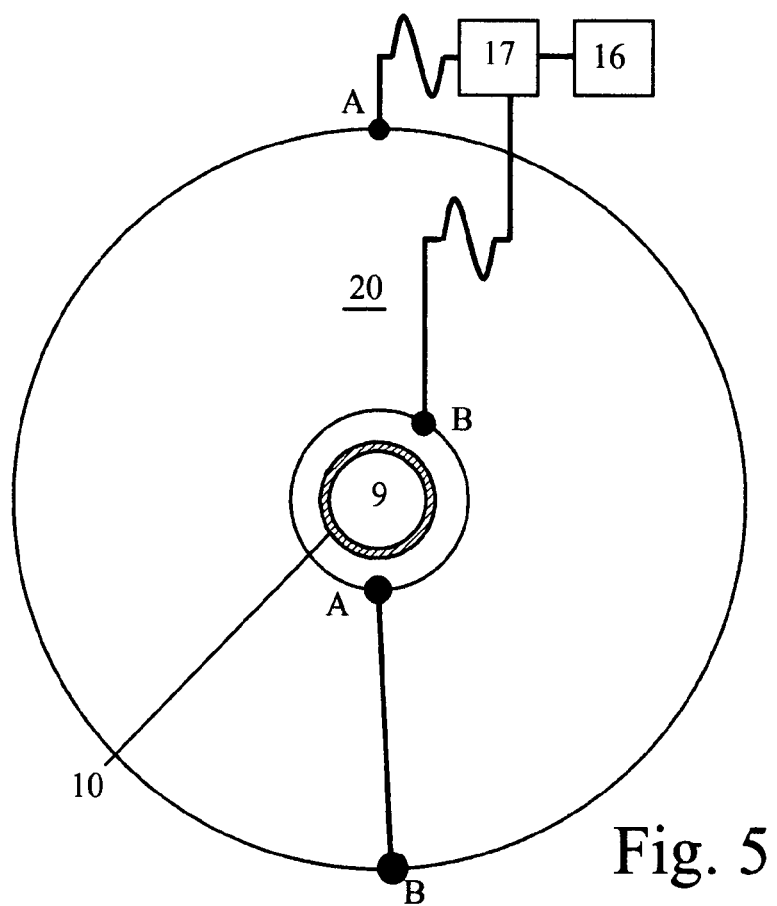
FIG. 5 is a top view of the preferred embodiment of the inductor, a bifilar pancake coil.

Considerable energy oscillates between the electric and magnetic fields of the bifilar pancake coil which is the preferred embodiment of the inductor 20 and is shown with more particularity in FIG. 5. Brine has conductivity in the semiconductor range, and is 100 times more conductive than drinking water, so the effect of the inductor 20 will be to screen brine from the axial exhaust port 9 while allowing low salinity or fresh water to pass through the passage for sink flow 19 between the baffle and the casing. This separating effect is due to two mechanisms: differential wall-normal force and differential induced viscosity. Both are due to the difference in conductivity between brine and fresh water.

Figure 3:
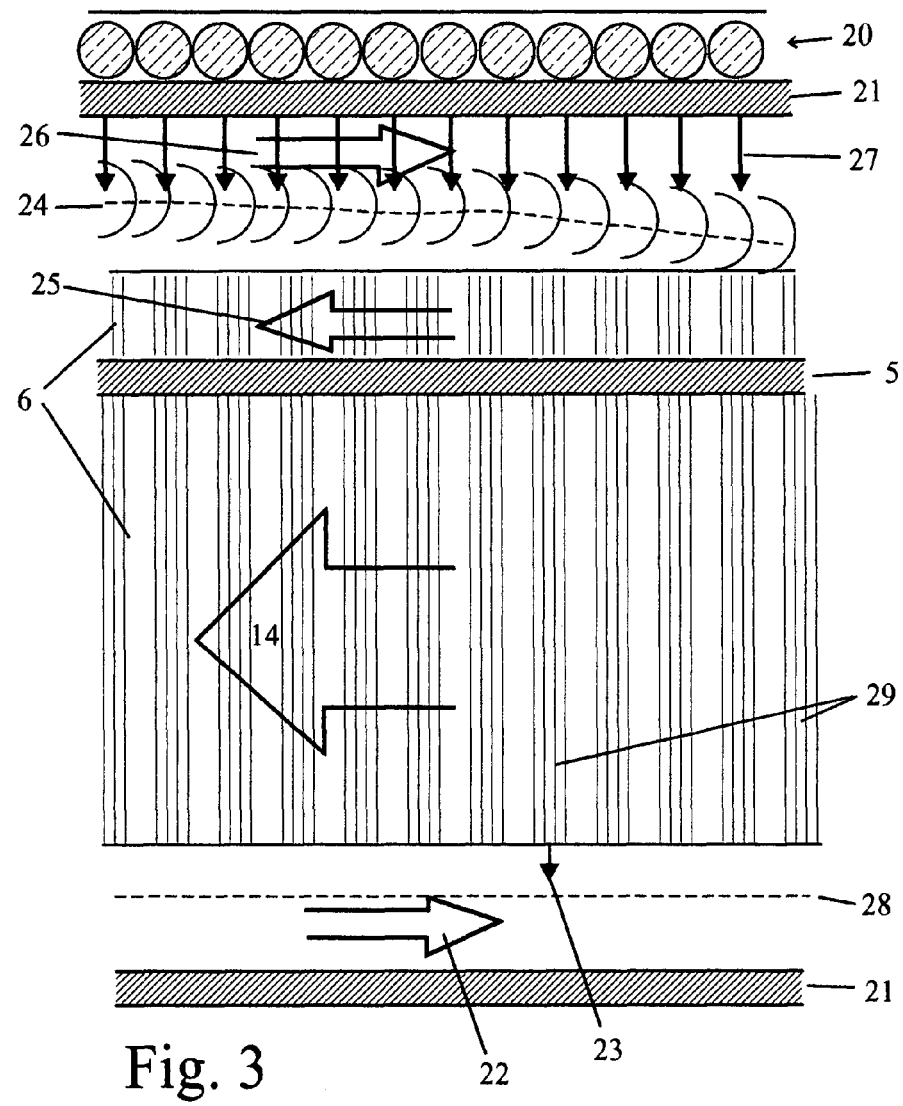
FIG. 3 is a detail cross section of a portion of the space within the casing while radial counterflow is taking place, showing the various flows and forces.

The alternating magnetic fields from the inductor 20 induce eddy currents in the brine. According to Lenz's law, conductors, such as the eddy current loops, are repelled from the cause of induced current: the inductor 20. Entrained brine in the passage 19 for sink flow is repelled by a wall-normal force 27 away from the wall of the casing. Fresh water, which is a poor conductor, and oil, a dielectric, are not repelled. Higher frequencies will cause higher repulsive effects and thus greater separation of brine and fresh water and oil, according to Faraday's law. Brine entrained in sink flow therefore curls away from the inductor 20 and into a boundary layer atop the baffle 5, where it is advected radially outward by the centrifugal pump away from the axial exhaust port 9. Thus any entrained brine is caused by electromagnetic means in combination with turbulent means to diverge from sink flow converging radially inward to the axial exhaust port 9. FIG. 3 shows the wall-normal effect in more detail.

The vortex flow in the turbulent vortices serves to magnify the wall-normal force 27 on entrained brine. Flowing away from the inductor in the vortex, brine will be accelerated, and flowing toward the inductor, brine will be decelerated. Fresh water will continue its vortex flow 24 without acceleration or deceleration by the inductor. The net effect over many vortex revolutions is that brine will collect in the boundary layer on top of the baffle, which is advected away from the axial exhaust port by the runners of the baffle.

Vortices of brine are solenoidal conductors having a core of nonconductive fresh water. Induction of the solenoid causes it to be ejected by Lenz's law from the passage 19 for sink flow between the baffle and the casing. Fresh water, stripped of its conductive brine shell by said inductive ejection of brine shells, continues sink flow along the vortex axis.

Another cause of wall-normal force 27 is the Lorentz force on ions in the brine. An advantage of the present invention is that turbulence assists in physical water treatment by Lorentz force. The Lorentz force on ions is a function of fluid velocity and magnetic field strength, both of which are high in the present invention due to high turbulence and the powerful near field induction from the RF bifilar pancake inductor 20.

The inductor 20 could be of many different designs, and all are included within the ambit of the claims. The RF bifilar pancake coil design disclosed by Tesla is the best mode known to me, but economy or other considerations might dictate the use of direct current inductors, permanent magnets, low frequency inductors, and other designs. For said other inductors, the high turbulence, and consequent high angular velocity, in the passage for sink flow 19 increases the separating effect of Lorentz force on ionic complexes moving through the B field of the inductor. Brine velocity also aids in inducing eddy currents even without alternating current. Brine eddy currents are repulsed from the inductor due to their induced counter-emf and its opposite magnetic field.

Turbulence gives high angular velocity with low sink flow velocity so that the Lorentz force has time to act appreciably during flow through the passage 19 for sink flow. That is especially true where the radially inward flow is slowing through a convergent nozzle, which is the case in said sink flow. Prior art has considered laminar flow, i.e. slow and non-turbulent flow, to be advantageous in physical water treatment by Lorentz force because re-entrainment of ions in flow of fresh water could not be avoided in turbulence. The coherent vortex network and its forcing regime disclosed in the present invention provides means for turbulence to be harnessed as a helper.

The magnetohydrodynamic (MHD) effect is induced bulk viscosity due to fluid flow through a magnetic field. Investigators have looked at the MHD effect as a way to reduce turbulent drag on seagoing vessels by increasing the viscosity of fluid in the boundary layer. There is also an electrohydrodynamic effect due to an electric field.

Conductive constituents such as brine in the bulk become more viscous due to the inductor 20. Turgid brine jams in the convergent flow squeezing in toward the axial exhaust conduit 10 but fresh water, which is not as conductive, slips through the brine clots just like a river flows through a logjam. The MHD effect is a function of conductivity, field strength, and fluid velocity, all of which are high in the present invention.

Blood is like seawater in its conductivity, and in a 6 T field used for magnetic resonance imaging (MRI) investigators have discovered that blood flowing at its usual velocity in the body increases in pressure by 10%, and in a 10 T field the pressure increase is 28%. Induced viscosity is considerable even at the slow flow of blood.

Seawater has a conductivity, $\sigma$, of 4 S/m (Siemens/meter), relative permittivity, $\in_r$, of 81, and relative permeability, $\mu_r$, of approximately 1. Using these parameters in known theory it appears that seawater is a good conductor of electromagnetic energy for frequencies lower than approximately 800 MHz (radio frequencies). A rule of thumb is that seawater skin depth (in meters)=$225/f^{1/2}$. At radio frequencies, wave length is on the order of meters, therefore the effect on the brine in the casing would be a near field effect. The skin depth of seawater is on the order of centimeters at 10 MHz and on the order of meters at 10 kHz. At 5 Mhz the skin depth is approximately 10 cm. The higher the frequency, the higher the loss through the medium and therefore the shallower the skin depth. High loss is good for separation.

Skin depth is the distance through the conductor where amplitude of the propagating electromagnetic wave has decayed to 37% of its initial strength. The attenuation of an electromagnetic wave propagating through a conductor is a direct consequence of power losses due to eddy currents. The repulsive work done on brine is one result, and Joule heating is another. From the example of seawater, and the known theory of skin depth, it should be clear to those of ordinary skill in the art what frequency to drive the inductor in devices according to the present invention in order to protect the axial exhaust port from brine intrusion.

The centrifugal pump causes shear between the concentrated brine and the tank wall. Agitation improves heat exchange with cooling means 33. Cooling aids crystallization of sodium chloride. Solvent is continuously extracted out of the tank through turbulent vortex axes and through the axial exhaust port 9, accelerating crystallization of all salts by increasing concentration. Crystals and precipitates and other solids pass through the crystallized solids port 32 to further processing by suitable means, including another device of according to the present invention. Mother liquor containing concentrated solution of uncrystallized salts, including nitrate and sulfate salts, passes through the concentrated brine port 31.

For produced brine from oil and gas wells, oils and light hydrocarbons are axially extracted along with fresh water and gases because they are less dense than salt water. The inductor 20 separates brine, a good conductor, from oils, which are dielectric, even in colloidal suspensions, and even in high turbulence. Produced brine having sand and tar can be fed into the preferred embodiment. The sand and tar collect in the tank, along with concentrated brine, while fresh water, valuable hydrocarbons, and gases flow through the axial exhaust port 9. Oil-water separation occurs in another device according to the present invention, using the output of the axial exhaust port as feed for the follow-on device of the cascade.

Figure 2A:
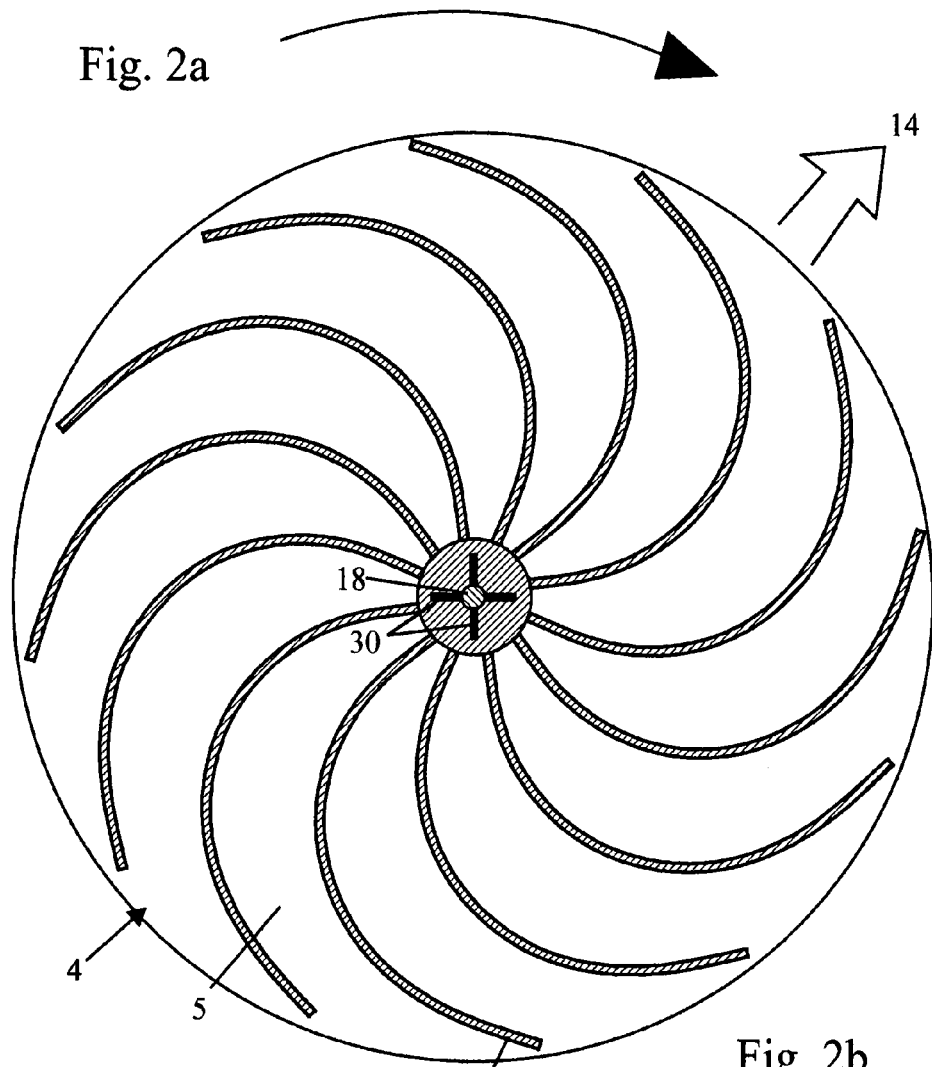
FIG. 2a is a detail of the centrifugal pump in the preferred embodiment.

FIG. 2a shows a detail of the array of runners of the centrifugal pump 4. The view is looking upward toward the inductor 20 from under the pump from the axial feed port 2. Spiral runners 6 are below and above the baffle 5 and as the centrifugal pump rotates in the direction indicated by the arrow, fluid is advected by the runners radially outward in source flow 14. A drive spindle 18 at the center of the impeller is connected to drive means 7 and is connected by keys 30 to the centrifugal pump 4.

Figure 2B:
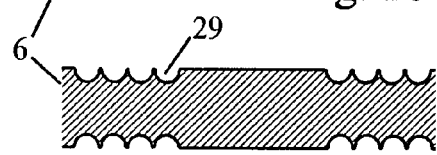
FIG. 2b is a detail cross section of a portion of an impeller runner.

FIG. 2b shows a cross-section of a runner, showing the grooves 29. The grooves increase traction of the runner by increasing surface area an by presenting a surface normal to the direction of advection. The grooves also trap metals and other heavy fractions suspended in the brine. Metals are high density constituents, therefore they have high inertia when their fluid complex is pushed by the runner. Liquids and lighter solids quickly acquire wall-normal velocity as momentum is imparted by the runner due to their low mass, but metals are relatively sluggish and drag along on the runner until falling into a groove. Flow over the groove entrains light solids but not the metals. The result is that metals, even fine particles, collect in the grooves 29.

Metals are excellent conductors. Gold and silver are particularly good conductors. Inductive repulsion from the inductor 20 flushes metals out of the grooves by Lenz's law. Flushed metals fall into the sink flow of solids 22 which occurs below the runners of the centrifugal pump and is caused by the teacup effect, a recirculating flow from the tank which preferentially advects high density constituents.

Gravel, sand, clay, and other relatively non-conductive solids proceed in source flow 14 along the runners to the tank 13.

The present invention provides means for remediating saline soils. This is an important unsolved problem in the world, because years of irrigation and osmosis have caused salts to migrate from below ground to the surface. High salinity kills crops. A slurry of such soil could be brine fed to the preferred embodiment shown in FIG. 1. Gold mining and other metal recovery from such slurry could make soil remediation economically profitable.

Metal recovery from industrial wastewater and pit water could also be accomplished in the preferred embodiment, with conductive metals collecting in the grooves and being flushed out by inductive repulsion into sink flow and collected under the pump.

FIG. 3 shows a detail cross-section of a portion of the space within the casing 21. This shows the various flows and forces operating in the preferred embodiment. The baffle 5 is between the top and bottom walls of the casing 21 and under the inductor 20. A source flow 25 above the baffle is caused by rotation of the runners 6 of the centrifugal pump 4 which comprises the baffle.

Sink flow of solids 22 in a boundary layer 28 on the bottom section of the casing 21 is caused by recirculating flow pressure from the impeller advecting brine into the tank. Heavy solids, such as gold and metals, are advected preferentially radially inward, by the teacup effect. Other solids rejoin the source flow 14. Grooves 29 on the impeller runners 6 trap solids which may be suspended in the brine. Inductive repulsion causes a flow 23 of metals through the grooves and into the sink flow 22. Repulsion from the inductor prevents source flow of metals and steers them into the sink flow 22 below the baffle 5.

A vortex having a vortex axis 24 is between the casing 21 and the baffle 5 in the passage 19 for sink flow to the axial exhaust port 2 (not shown). The vortex is caused by shear. Wall-normal induced force 27 on entrained brine caused by the inductor 20 bends the vortex axis 24 into the boundary layer on top of the baffle 5. The boundary layer is advected radially outward as shown by the arrow 25. A sink flow 26 of fresh water goes through the passage 19 for sink flow, advected by the suction of an axial pump 11 (not shown) and the back pressure from brine pumped centrifugally into a shrouding tank 13 in source flow 14 below the baffle 5. Fresh water is relatively non-conductive, therefore the inductive repulsion does not affect fresh water and its flow is unobstructed.

FIG. 4 is a detail of the tank 13 in the preferred embodiment shown in FIG. 1. The dashed line shows where the two figures connect. A source flow 14 of brine into the tank 13 causes a recirculating flow pressure and a sink flow 15. Brine confined in the shrouding tank 13 about the centrifugal pump 4 is continuously concentrated by extraction of solvent in sink flow. Sink flow is also driven by the suction of an axial pump 11. Crystallized sodium chloride and other solids are extracted from the tank through a crystallized solids port 32 at the bottom of the tank. The crystallized solids port 32 comprises suitable means for regulating flow. Flow through the crystallized solids port will be principally sodium chloride if it is the salt that crystallizes first in cooling.

A chilling jacket 33 provides cooling means to assist crystallization of sodium chloride. The chilling jacket preferably is filled with brine and communicates with a brine chiller. The cooling jacket continuously extracts heat from the tank as turbulent flow circulates over its surface. Cooling does not cause calcium carbonate to dissolve because concentration is high.

Mother liquor containing a concentrated solution of other salts, such as nitrates and sulfates, flows through a concentrated brine port 31 to further processing by suitable means. The concentrated brine port 31 comprises suitable means for regulating flow. Brine can thereby be retained in the tank to suit process requirements. Feed brine is continuously fed into the tank, and water is continuously axially extracted, therefore brine concentrates to supersaturation and crystallizes.

A gas port 34 connected to suitable means for regulating flow 35 provides means for gases to be extracted from the tank. Gases are also extracted in the sink flow 15. Another product of crystallization which is extracted is fresh water, the solvent which leaves the tank in the sink flow 15 due to back pressure and the suction of an axial pump 11. Extraction of products of crystallization prevents brine entering the tank from re-dissolving the crystals.

Runners 6 impel fluid into the tank, and cause rotation of brine which shears against the tank walls, creating high turbulence in the tank 13. A back pressure shown by the right pointing arrow drives sink flow 15 away from the tank. Because of the presence of vortices in the turbulence, the back pressure encounters weak points in the bulk, these weak points being the axes of turbulent vortices, where there are low pressure gradients. Turbulence creates effective porosity in the bulk. Turbulence increases the momentum of ions and grinding of adjacent vortex brine shells increases the probability of ions colliding for crystallization.

On startup, the gas vent 34 is left open to exhaust all gases. When the centrifugal pump 4 is rotating at the speed required for operation, feed is introduced through the axial feed conduit 1 and gases flow through the gas vent to remove most gas from within the apparatus. Once the gases have been flushed, the gas vent is adjusted so that pressure in the tank increases, thereby driving the sink flow of fresh water. NPSH for the axial pump 11 is provided by the back pressure.

FIG. 5 shows a detail of the inductor preferred in both the preferred embodiment and in the alternative embodiment shown in FIG. 6. The preferred embodiment of the inductor 20 is a bifilar pancake coil disposed concentric with the axial exhaust port 9 such that convergent sink flow through the passage 19 for sink flow toward the axial exhaust port must pass through the oscillating E and B fields from the inductor 20. The casing, which is of non-conductive material, separates the inductor from the flow between the baffle and the casing wall.

The bifilar pancake coil shown is a known device. See U.S. Pat. No. 512,340 to Tesla (1894) FIG. 2 thereof for a drawing of a bifilar pancake coil, which drawing is incorporated herein by reference. A bifilar pancake coil is two coils in series, having their interleaved parallel wires wound together in a flat spiral. Current flows in the same direction in parallel wires. Other bifilar coils wound in a different manner have current flowing in opposite directions in adjacent windings. These are also included in the definition of inductor but are not in Tesla's patent.

In the preferred embodiment, current flows from a terminal at the periphery of the pancake spiraling inward in a first coil A to the center of the pancake, then into a jumper cable from the center to the periphery of the pancake again, beginning a second coil B. Current in the second coil B spirals inward alongside the first coil A to the center of the pancake, where there is the other terminal connecting the pancake coil to the current varying means 17.

There is an approximately equal distance lengthwise between any pair of adjacent wire segments in the bifilar pancake coil, this distance being approximately half the combined length of the two coils. There is a voltage drop over this distance, therefore there is a relatively large potential difference between the adjacent insulated wire segments. Parasitic capacitance allows for high frequency operation. Preferably, the driving frequency for the inductor 20 is in the radio frequency (RF) range and is equal to the natural angular frequency of the LC oscillator it comprises so as to achieve a resonance condition. Resonance minimizes impedance so input power will be transmitted efficiently into the brine to cause separation and crystallization.

In the RF range, all induction will be from near field effects because the wavelength is longer than the separation of the baffle 5 and the casing 21. Induction will be caused by electrical fields, manifesting as displacement currents, and by magnetic fields, manifesting as eddy currents. Induction causes a wall-normal force 27 on conductive constituents, pushing them away from the casing in the passage 19 for sink flow. Inductive repulsion drives conductive constituents such as entrained brine into a boundary layer against the baffle 5 defining the passage 19 for sink flow, and rotation of the baffle advects the boundary layer away from the axial exhaust port, thus protecting against brine intrusion in product water. The magnetic field from the inductor 20 in combination with turbulent flow velocity also causes Lorentz force on ions which results in wall-normal force 27 on brine.

Tesla offers the following example to show that the bifilar pancake coil design allows for high energy storage. A conventional coil of 1000 turns having a potential of 100 volts across its terminals will have a difference of 0.1 volt between turns. If the windings were bifilar, there would be a potential of 50 volts between turns. Energy storage in a capacitor is proportional to the square of the voltage, so the bifilar pancake coil will be $50^2/0.1^2=250{,}000$ times more capacious than the conventional coil in this example.

Of course, appropriate grounding and shielding means known to the art are appurtenant to the inductor 20. Said means are not shown because they should be known to those of ordinary skill in the art.

FIG. 6a and FIG. 6b show an alternative embodiment of the present invention, wherein the centrifugal pump 4 comprises a bottom impeller 39 and a top impeller 40. FIG. 6a joins to FIG. 6b at the dotted line, as indicated. The casing 21 of this alternative embodiment comprises the impellers 39, 40. The bottom impeller 39 is connected to the baffle 5 by runners 6, which form spiral feed channels allowing for flow from the axial feed port 1 under the baffle 5 and radially out from the axis a-a into the tank 13. The impellers rotate in opposite directions as shown by the arrows at approximately the same speed. Counter-rotation causes shear between advected boundary layers of brine against each impeller. Shear causes turbulence and radial vortices 41 in the free shear layer between the impellers.

The preferred means for causing the impellers to counter-rotate is a drive wheel 37 turned by a drive spindle 18 and drive means 7. Alternative means for counter-rotation are separate motors connected to each impeller, and a single motor connected by gears or belts. For example, contra-rotating propellers are known in aviation.

The space between the impellers 39, 40 communicates with the interior of the tank 13. Seals 36 between the impellers and the wall of the tank 13 maintain pressure within the tank as the impellers rotate, sliding against the seals. Other bearing seals 38 between the impellers and the axial exhaust conduit 10 and the axial feed conduit 1 allow said conduits to remain stationary as the impellers rotate.

In the brine between the counter-rotating impellers 39, 40 is a free shear layer. Turbulence is high between the impellers and in the tank, and turbulence improves separation of brine from fresh water by specific gravity in shear vortex centrifugation. Radial vortices 41 in the shear layer provide arterial sink flow conduits for collecting the microscopic separation effects in turbulent eddies so that fresh water and gases go in an expedited flow path to axial extraction.

An advantage of the alternative embodiment shown in FIGS. 6a, 6b is that the radial vortices 41 enhance the dynamically created bulk porosity by straightening the radially inward sink flow paths. In the embodiment shown in FIG. 1, the radially inward flow is through spirals, not straight lines. A disadvantage of the alternative embodiment shown in FIGS. 6a, 6b is the necessity of seals 36 to maintain tank pressure and a more complicated design. Of course, the tank and casing could be continuous, enclosing both counter-rotating impellers. However, the additional turbulent drag on the impellers from shear with the enclosing additional casing would waste energy.

If expense is no objection and the seal problem can be solved, the device shown in FIGS. 6a and 6b would be the best mode of practicing the present invention because turbulence is higher and more organized. Less energy would be required to drive sink flow, which takes place above the baffle 5 of the bottom impeller 39 and under the top impeller 40. The passage 19 for sink flow is in higher shear than in the preferred embodiment because both of its defining surfaces are counter-rotating.

Shear between the baffle and the top impeller, while they counter-rotate, creates radial vortices 41 which extend from the axis of rotation in an array like spokes in a wheel and provide coherent low pressure gradients for sink flow. The suction of the axial pump 11 and the back pressure from the tank drive fresh water through the radial vortices. The radial vortices communicate with low pressure gradients at the axes of eddy vortices, therefore there is a coherent network of connected low pressure gradients communicating with the axial pump and providing means for axially extracting fresh water out of the casing continuously as brine flows through the axial feed port 2.

An inductor 20 excludes brine from sink flow, and also excludes metals from source flow, as described previously. Joule heating from the inductor provides activation energy for precipitation of calcium carbonate and sulfate salts which cause scale. Carbon dioxide gas and fresh water solvent resulting from crystallization are continuously extracted from the solution in sink flow, favoring the forward crystallization reaction. Gases also flow through the gas vent 34. Precipitated calcium carbonate crystals are centrifugated by the turbulent vortices into a boundary layer against the centrifugal impellers and advected radially outward into the tank. Precipitated scale, solids, and crystallized salts flow through the crystallized solids collection port 32 and concentrated brine flows through the concentrated brine port 31.

Further Discussion:

The axial pump 11 is only one means for driving sink flow 15 and back pressure alone could be sufficient. However, the addition of an axial pump is preferable because it serves to stretch the vortex axes and thereby increases vorticity.

Cascading devices according to the present invention would improve brine separation. In other words, the low salinity water coming from the axial exhaust conduit 10 is fed into a second device according to the present invention and separated further, and so on, until the output from the axial exhaust conduit is potable. Also, the concentrated brine flowing from the tank through the concentrated brine port 31 could become the feed for a follow-on device to crystallize other salts, such as nitrates.

Extraction of fine gold particles from a slurry is another application of the present invention. Gold is very conductive, so the inductor 20 would powerfully repel gold and thereby hinder its flow radially outward. Gold is also very dense, so the inductive repulsion would not be overcome by feed flow. Gold would join the sink flow of solids 22 and fall into the solids collection tank 8 while gravel and other non-conductive solids would proceed into the tank. Extracting metals from industrial wastewater and pit water could also be done in the same device. Oils incident to metal finishing would be axially extracted through the axial exhaust conduit 10 and solvent and non-conductive solids would be recovered in the tank.

Turbulent converging sink flow through the field of an inductor, with means for radially outward advection of brine from the space of sink flow, is the best mode for practicing the present invention. However, the inductor might not be necessary, especially in the embodiment shown in FIG. 6a, 6b. Centrifugal separation of brine from fresh water in organized turbulence, with effective bulk porosity and sufficient back pressure and/or axial suction to drive sink flow through the low pressure gradients at the axes of turbulent vortices, could also produce fresh water from brine, without the need of an inductor to protect against entrained brine intrusion. However, the inductor causes precipitation of scale-forming salts and increases the effectiveness of organized turbulence, therefore its inclusion is preferred.

Radial counterflow within a casing is advantageous because the pressure developed by a centrifugal feed pump becomes a back pressure driving the sink flow, and the shrouding tank collects the concentrated brine advected by the centrifugal pump. However, alternatives are possible, including rotating surfaces having inductors and disposed within a tank, with hydrostatic tank pressure driving sink flow. Many alternative configurations for the casing and the centrifugal pump are possible, including cone-shaped casings and/or pumps. Another alternative is a pump or other means to pressurize the feed before the axial feed inlet.

Gold mining to recover minute particles from a slurry could be practiced in the present invention. This bonus to its use in desalination would make the present invention preferable for desalinating soils, to make them suitable for growing food again.

It should be apparent to those of ordinary skill what particular applications of the novel ideas presented here may be made given the description of the embodiments. Therefore, it is not intended that the scope of the invention be limited to the specific embodiments described, which are merely illustrative of the present invention and not intended to have the effect of limiting the scope of the claims.

Instructed hindsight on the part of those of more than ordinary skill in the particular art of desalination should not be admitted as ex post facto evidence that the present invention was obvious or that they could easily have done it had they bothered, when the serious problem of brine pollution and fresh water shortages has remained unsolved by so many for so long.

I claim:

1. An apparatus for separating a brine, comprising:
   a casing having a centerline, the casing comprising an axial feed port and an axial exhaust port, both ports being coaxial with the centerline;
   a rotatable centrifugal pump disposed within the casing and connected to a driver, the centrifugal pump having an axis of rotation at said centerline and the centrifugal pump configured to draw brine into the casing through the axial feed port;
   a tank communicating with the interior of the casing and configured such that brine from the axial feed port, when advected radially outward from the centerline by the centrifugal pump, collects and concentrates in the tank;
   a rotatable baffle disposed between the axial feed port and the axial exhaust port and spaced apart from the casing so as to define a high-shear radially inward sink flow passage for water from the brine to be extracted from the casing through the axial exhaust port; and
   at least one radio frequency bifilar pancake coil adapted to repel brine from flow in the sink flow passage into brine advected radially outward by the centrifugal pump when the apparatus is operative, the coil disposed above the sink flow passage.

2. The apparatus of claim 1, further comprising an axial pump communicating with the sink flow passage through the axial exhaust port, the axial pump configured such that flow through the sink flow passage goes through the axial exhaust port and through the axial pump.

3. The apparatus of claim 1, wherein the tank comprises means for evacuating solids and concentrated brine contained therein.

4. The apparatus of claim 1, wherein the baffle is connected to the centrifugal pump and rotates therewith.

5. The apparatus of claim 1, wherein the centrifugal pump comprises at least one runner having grooves transverse to the flow over the runner.

6. The apparatus of claim 1, further comprising means for collecting metals, said metal collecting means disposed below the axial feed port.

7. The apparatus of claim 1 wherein the radially inward sink flow passage extends substantially between the tank and the axis.

8. The apparatus of claim 1 wherein the tank is substantially annular in shape and wherein the tank communicates with the interior of the casing at the radially inward side of the tank.

9. The apparatus of claim 8 wherein the tank communicates with the interior of the casing substantially entirely along the radially inward side of the tank.

10. The apparatus of claim 1 wherein a portion of the casing comprises substantially parallel plates that define a substantially planar space, the pump having blades that are contained within the space.

11. The apparatus of claim 1 wherein the casing adjacent the sink flow passage is made from dielectric material.

12. The apparatus of claim 1, comprising a passage for sink flow of solids below the baffle and over a bottom wall of the casing into the axial feed port.

13. The apparatus of claim 1, further comprising a chilling jacket for cooling brine in the tank.

14. The apparatus of claim 3, wherein said means for evacuating solids and concentrated brine comprise a concentrated brine port and a crystallized solids port.

15. The apparatus of claim 1, wherein said sink flow passage above the baffle has a radius at least twice its height.

* * * * *